(12) United States Patent
Jeon

(10) Patent No.: US 10,069,529 B2
(45) Date of Patent: Sep. 4, 2018

(54) PORTABLE CHARGING CASE MODULE

(71) Applicant: Korea Electronics Technology Co., Ltd., Changwon-si, Gyeongsangnam-do (KR)

(72) Inventor: Jeong Hyeon Jeon, Changwon-si (KR)

(73) Assignee: Korea Electronics Technology Co., Ltd., Changwon-si (KR)

( * ) Notice: Subject to any disclaimer, the term of this patent is extended or adjusted under 35 U.S.C. 154(b) by 0 days.

(21) Appl. No.: 15/386,973

(22) Filed: Dec. 21, 2016

(65) Prior Publication Data

US 2018/0062687 A1   Mar. 1, 2018

(30) Foreign Application Priority Data

Aug. 30, 2016   (KR) .......................... 10-2016-0111048

(51) Int. Cl.
| | |
|---|---|
| *H04B 1/3888* | (2015.01) |
| *H04M 1/02* | (2006.01) |
| *H02J 50/10* | (2016.01) |
| *H02J 7/00* | (2006.01) |
| *H02J 7/02* | (2016.01) |

(52) U.S. Cl.
CPC .......... *H04B 1/3888* (2013.01); *H02J 7/0044* (2013.01); *H02J 7/025* (2013.01); *H02J 50/10* (2016.02); *H04M 1/0202* (2013.01)

(58) Field of Classification Search
CPC ............................ H04B 1/3888; H04M 1/0202
See application file for complete search history.

(56) References Cited

U.S. PATENT DOCUMENTS

| | | | | |
|---|---|---|---|---|
| 2004/0106308 A1* | 6/2004 | Chen | ...................... | H01R 23/10 439/79 |
| 2009/0179501 A1* | 7/2009 | Randall | ................ | H01R 25/147 307/104 |
| 2012/0088555 A1* | 4/2012 | Hu | ........................ | H04B 1/3883 455/573 |
| 2015/0295439 A1* | 10/2015 | Huang | ................ | H01M 2/1022 455/575.8 |

FOREIGN PATENT DOCUMENTS

| | | | | |
|---|---|---|---|---|
| KR | 10-1174674 B1 | 8/2012 | | |
| KR | 10-1386854 B1 | 4/2014 | | |
| KR | 10-1441677 B1 | 9/2014 | | |
| KR | 101441677 B1 * | 9/2014 | .............. | H04B 1/38 |
| KR | 10-2014-0135899 A | 11/2014 | | |

* cited by examiner

*Primary Examiner* — Yuwen Pan
*Assistant Examiner* — Zhitong Chen
(74) *Attorney, Agent, or Firm* — Novick, Kim & Lee, PLLC; Jae Youn Kim

(57) ABSTRACT

Provided herein is a portable charging case module. The portable charging case module includes a case part and an auxiliary battery part. The case part includes a body configured such that an accommodation recess is formed in the front thereof to be detachably combined with a terminal, a charging coil provided in the body and configured to wirelessly charge the terminal, and a first terminal unit formed in the rear of the body and configured to be electrically or data-wise connected to the terminal. The auxiliary battery part is detachably combined with the rear of the case part, and includes a second terminal unit configured to be electrically connected to the first terminal unit in the front of the auxiliary battery part facing the rear of the case part, and a connection port configured such that a connector connected to an external power source is inserted thereinto.

4 Claims, 16 Drawing Sheets

PORTABLE CHARGING CASE MODULE

BACKGROUND

1. Technical Field

The present invention relates to a portable charging case module.

2. Description of the Related Art

In general, the number of users of portable devices, such as mobile phones, etc., has been increasing. Recently, the use of smartphones that provide large-sized liquid crystal screens has also rapidly increased.

Accordingly, various types of batteries for supplying power to smartphones have been developed. However, problems arise in that the power of these batteries is discharged faster than that of the batteries of conventional mobile phones due to large power consumption attributable to an increase in the size of the liquid crystal screens of smartphones and smartphones cannot be used in an emergency due to the full discharge of the batteries.

To overcome these problems, Korean Patent No. 1174674 discloses charging devices using electromotive force. Of these charging devices, a case-type mobile phone charger includes a case body configured to be combined with an outside surface of a mobile phone, a charging terminal installed on one side of the interior of the case body and configured to be connected to the terminal of the mobile phone, and a battery part installed inside the case and configured to be connected to the charging terminal.

The case-type mobile phone charger is configured to receive power from an external power source and charge the battery part with the power, and to connect the charging terminal to a mobile phone as desired and charge the mobile phone. The case-type mobile phone charger has a problem in that it cannot be used when a user does not separately charge the battery part.

The case-type mobile phone charger has another problem in that power consumed cannot be supplemented when a mobile phone is frequently used, for example, when short, frequent use, such as a time check and a mail check via the liquid crystal screen of a mobile phone, is performed.

Therefore, there is an increasing need for a charger that can overcome the problems of the conventional case-type mobile phone charger and that can charge a mobile phone with the power of a case itself, rather than charging the mobile phone with separate external power.

SUMMARY

Accordingly, the present invention has been devised based on the above-described background, and an object of the present invention is to provide a portable charging case module that supplies power to the battery of a terminal and charges the battery with the power by using an auxiliary battery part that can be selectively attached to and detached from a case part adapted to protect the terminal, rather than charging the terminal with separate external power via the case part.

Furthermore, an object of the present invention is to provide a case part and an auxiliary battery part so that they can be attached to and detached from each other, and thus the auxiliary battery part can be combined with and used along with the case part when the battery of a portable terminal needs to be charged with power, thereby improving the convenience of use of the portable terminal.

Furthermore, an object of the present invention is to enable a case part and an auxiliary battery part to be combined with and separated from each other by magnetic force and the case part and the auxiliary battery part to be firmly and stably combined with each other by means of fastening portions that have recess and protrusion structures, respectively, and that are formed in the facing and contact surfaces of the case part and the auxiliary battery part, respectively.

Furthermore, an object of the present invention is to provide a portable charging case module in the form of modules, such as a case part and an auxiliary battery part, and thus only part of the modules can be replaced when the corresponding module fails or is damaged.

Furthermore, an object of the present invention is to provide an auxiliary battery part with a memory slot unit configured to accommodate external memory, and thus the storage capacity of the external memory can be added to a portable terminal's own storage capacity and then be used.

Objects of the present invention are not limited to the above-described objects, and other objects that have not been described above will be apparently understood by those skilled in the art based on the following description.

According to an aspect of the present invention, there is provided a portable charging case module, including: a case part which includes a body configured such that an accommodation recess is formed in the front thereof to be detachably combined with a terminal, a charging coil provided in the body and configured to wirelessly charge the terminal, and a first terminal unit formed in the rear of the body and configured to be electrically or data-wise connected to the terminal; and an auxiliary battery part which is detachably combined with the rear of the case part, and which includes a second terminal unit configured to be electrically connected to the first terminal unit in the front of the auxiliary battery part facing the rear of the case part, and a connection port configured such that a connector connected to an external power source is inserted thereinto.

According to another aspect of the present invention, there is provided a portable charging case module, including: a case part which includes a body configured to be detachably combined with a portable terminal, a first terminal unit provided in the body and configured to be electrically or data-wise connected to the portable terminal, and a wireless charging patch unit provided in the body and configured to be electrically connected to the first terminal unit and to charge the portable terminal connected to the first terminal unit; and an auxiliary battery part which is detachably combined with the rear of the case part, and which includes a battery cell unit, a second terminal unit configured to be electrically or data-wise connected to the first terminal unit and to be electrically connected to a connector connected to an external power source, and a memory slot unit configured such that external memory is accommodated therein or selectively attached thereto and detached therefrom.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Some embodiments of the present invention will be described in detail below with reference to the accompanying illustrative drawings. It should be noted that throughout the drawings, the same reference symbols will be assigned to the same or similar components as much as possible. Furthermore, in the following description of the present invention, when it is determined that a detailed description of a related well-known configuration or function may make the gist of the present invention obscure, the detailed description will be omitted.

Furthermore, in the following descriptions of the components of the present invention, the terms "first," "second," "A," "B," "a," "b," etc. may be used. These terms are used merely to distinguish corresponding components, and are not intended to limit essences, order, sequence or the like of the corresponding components. Meanwhile, when a component is described as being "connected," "combined," or "coupled" to another component, the former component may be directly connected, combined or coupled to the latter component, or the former component may be connected, combined or coupled to the latter component with a third component disposed therebetween.

Figure 1:
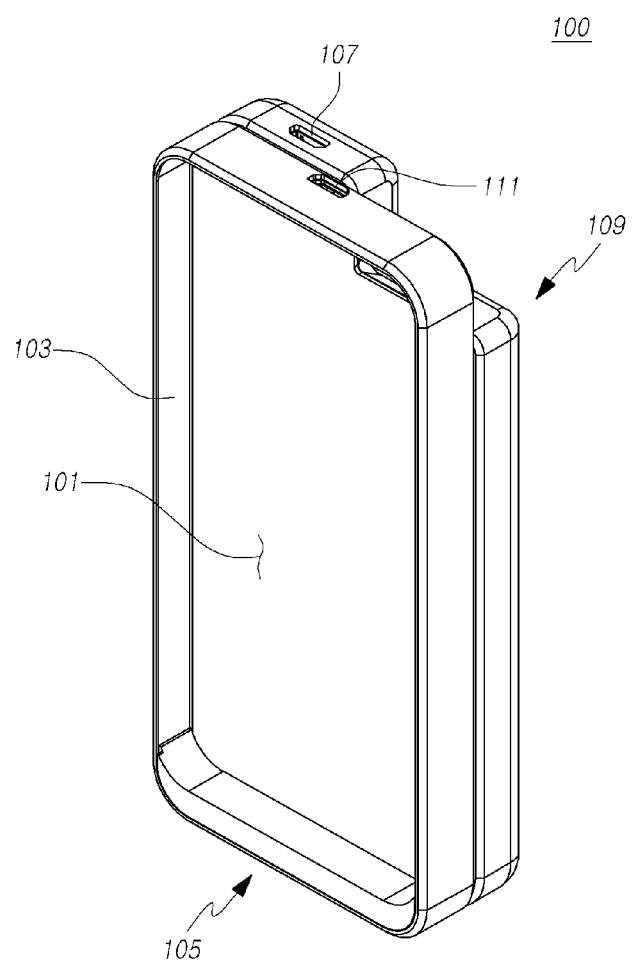
FIGS. 1 and 2 are perspective views showing a portable charging case module according to an embodiment of the present invention.
Figure 2:
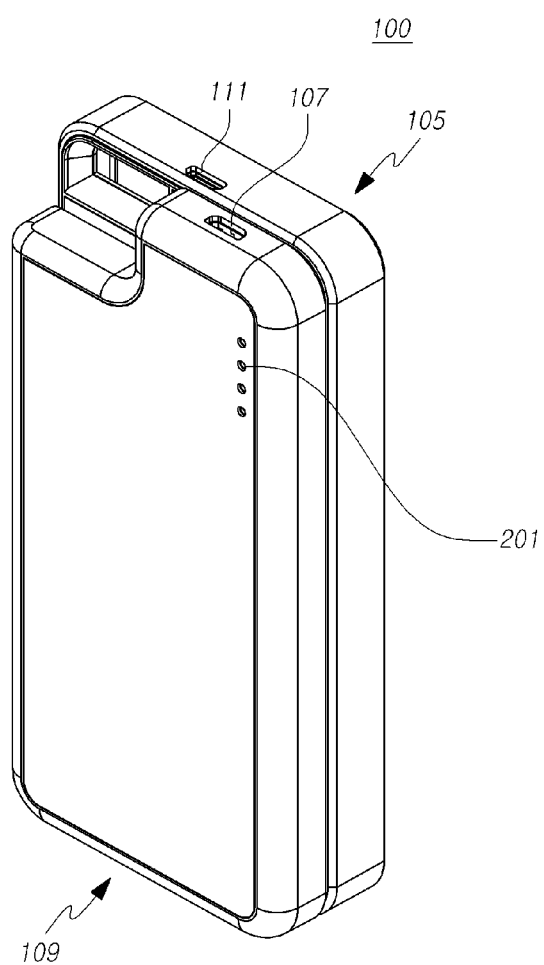
Figure 3:
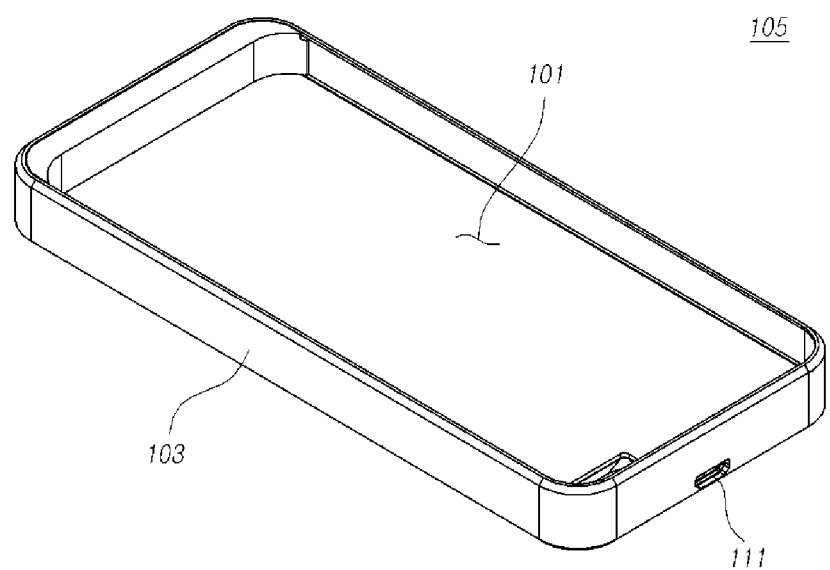
FIGS. 3 to 5 are diagrams showing the case part of FIG. 1.
Figure 4:
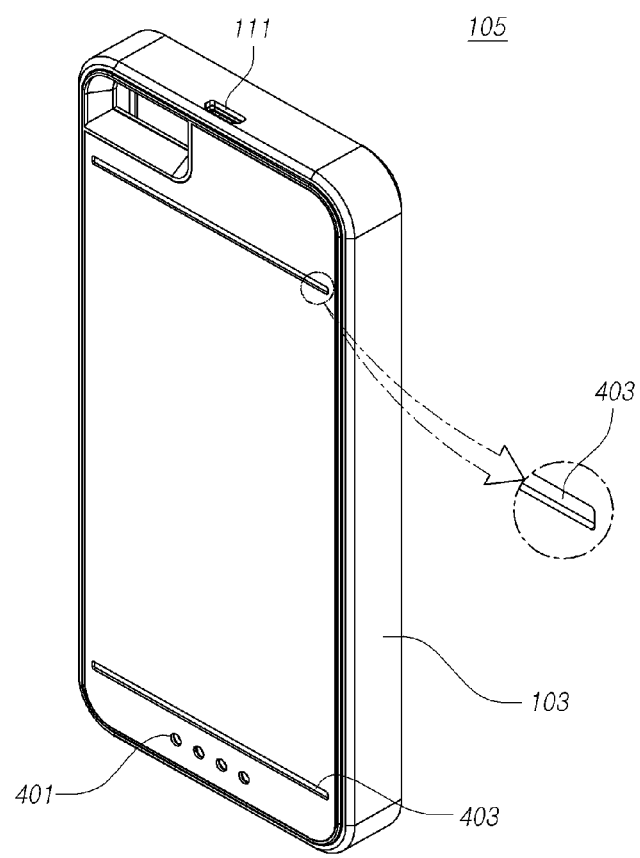
Figure 5:
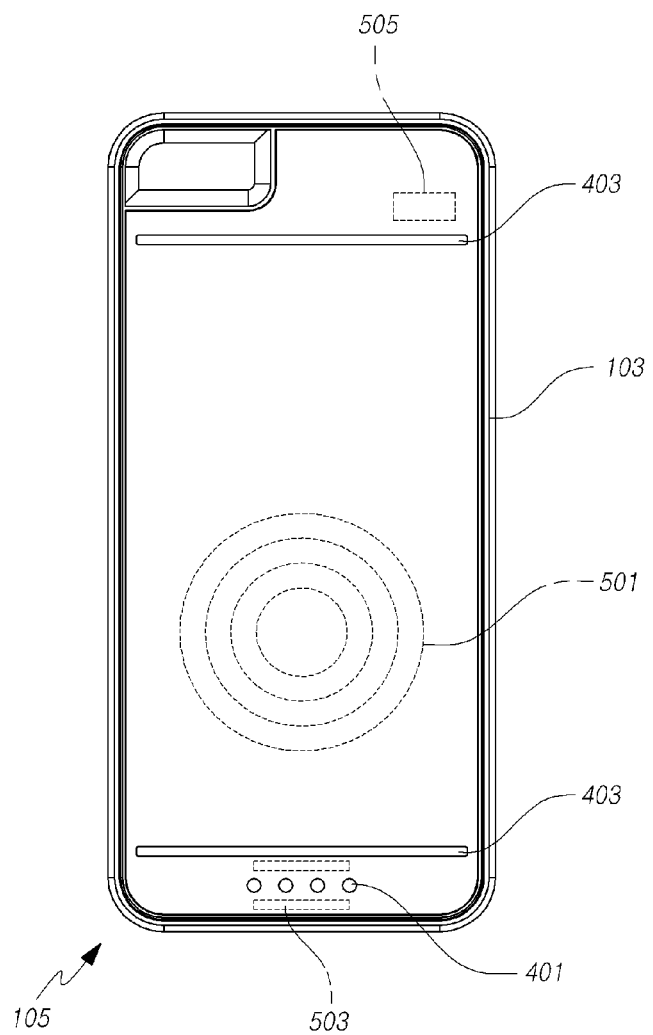
Figure 6:
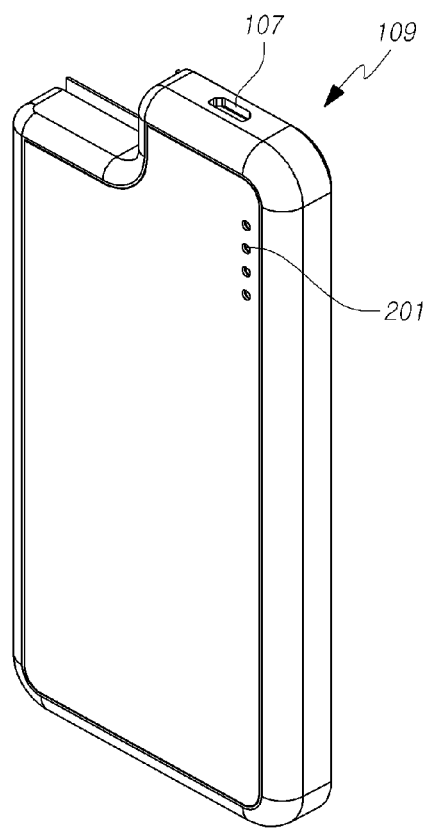
FIGS. 6 to 8 are diagrams showing the auxiliary battery part of FIG. 1.
Figure 7:
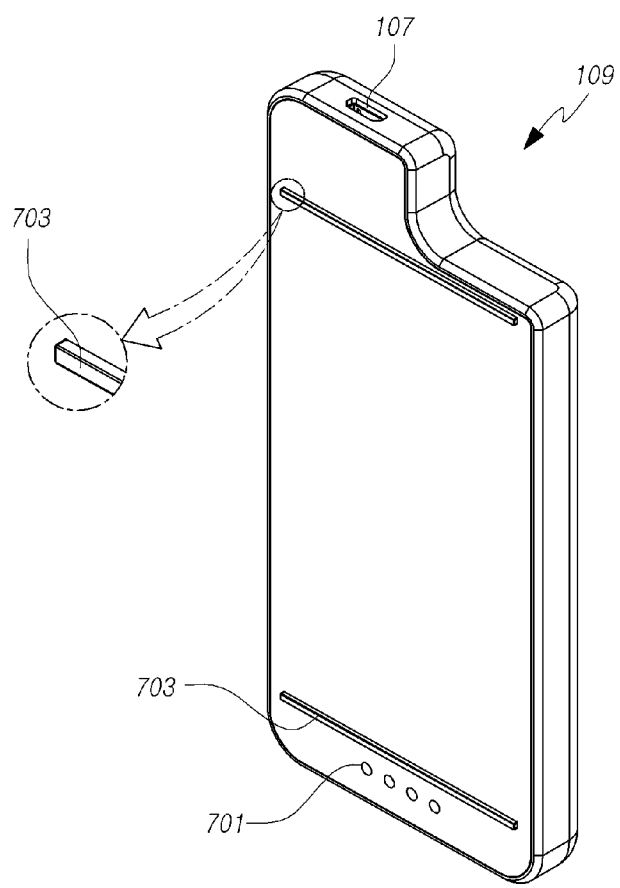
Figure 8:
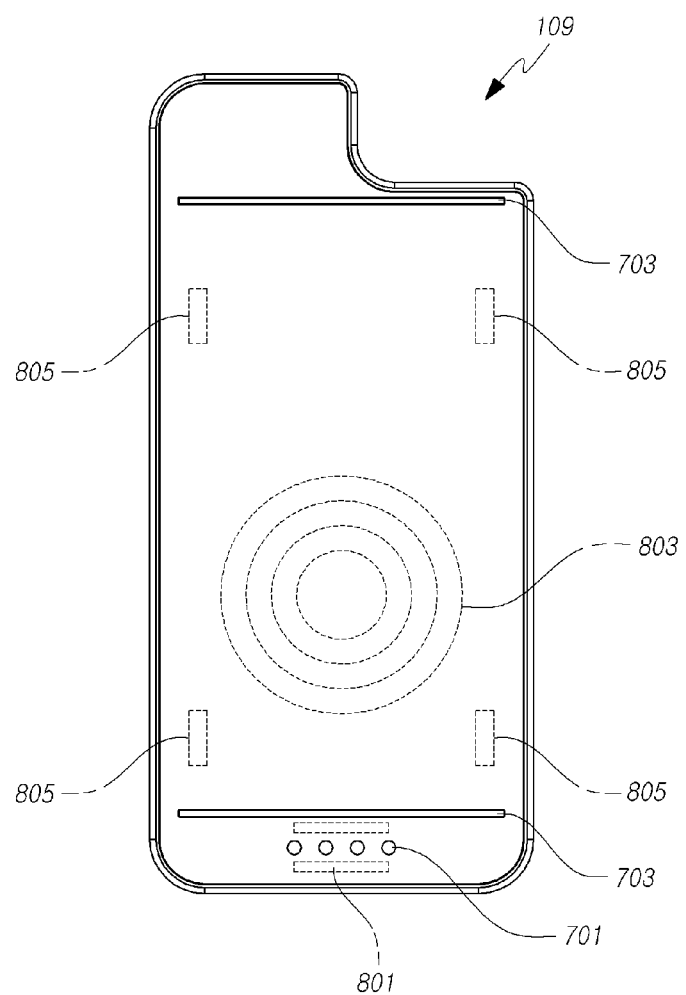
Figure 9:
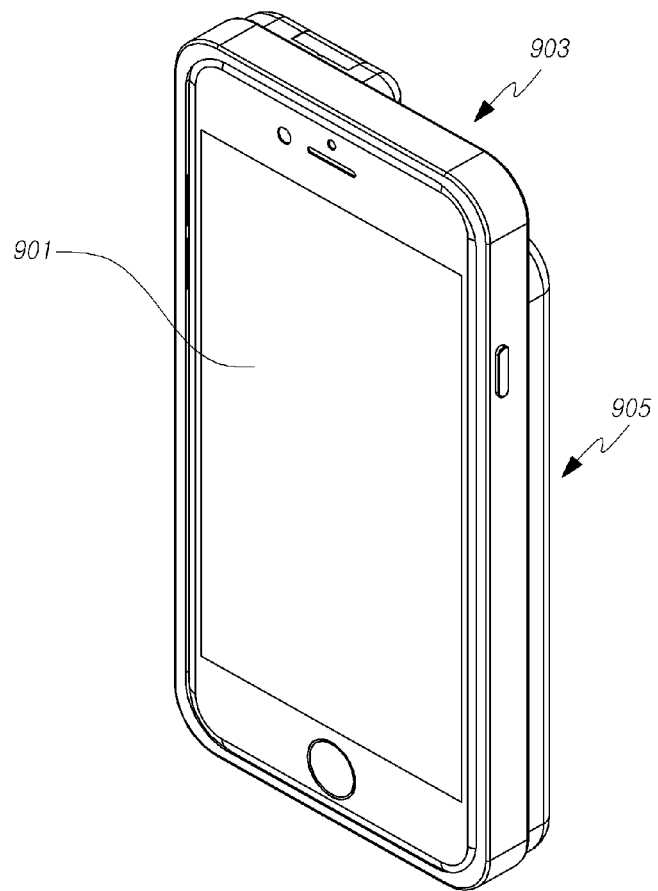
FIGS. 9 and 10 are perspective views showing a portable terminal and a portable charging case module according to another embodiment of the present invention.
Figure 10:
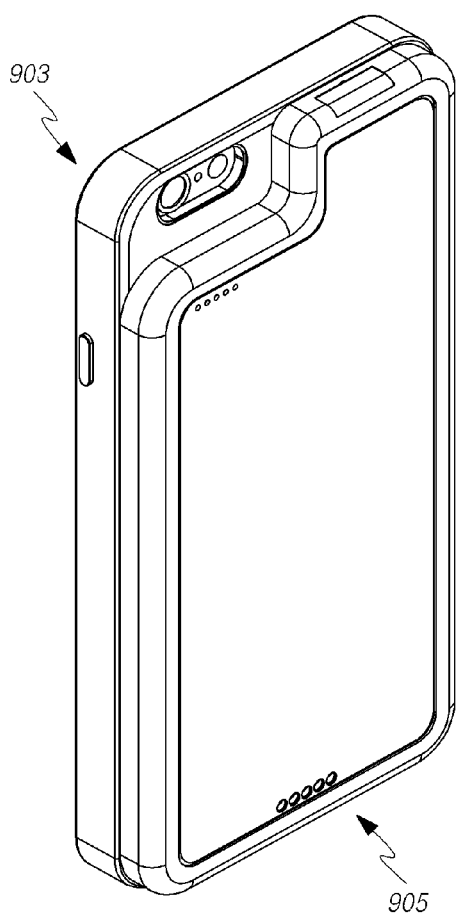
Figure 11:
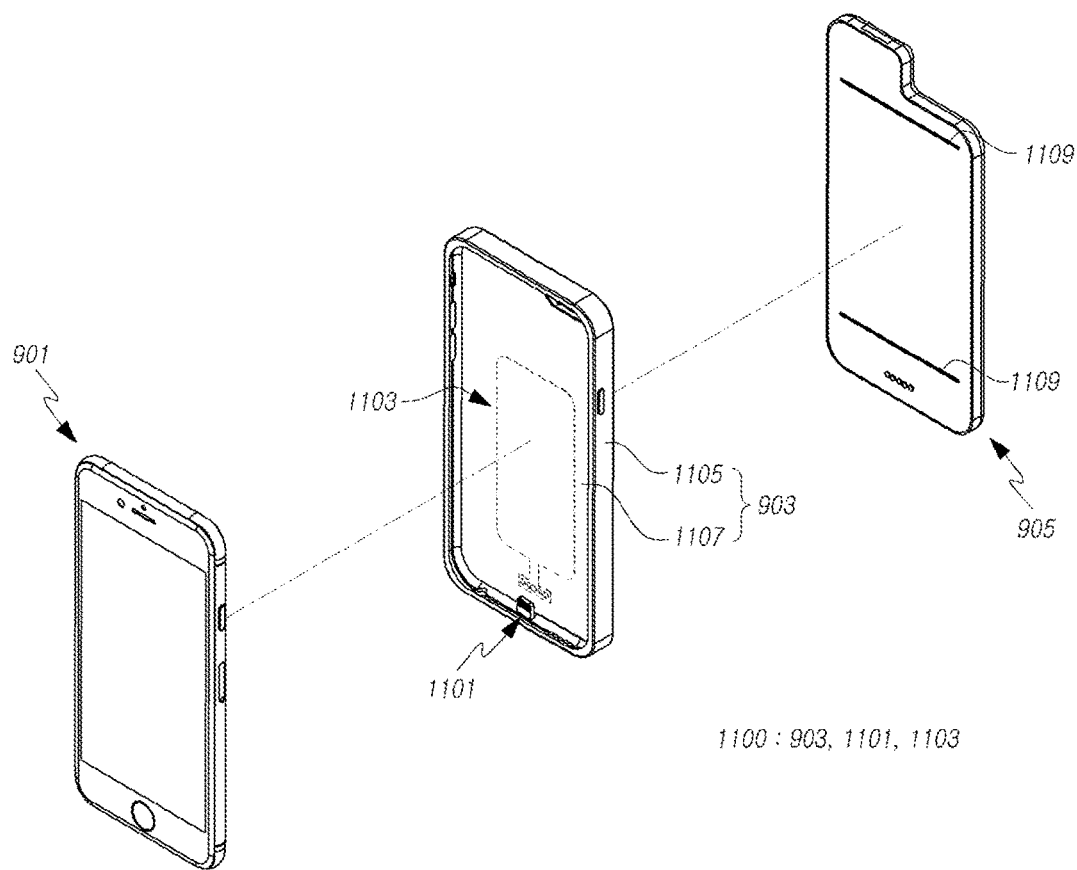
FIGS. 11 and 12 are exploded perspective views of FIGS. 9 and 10.
Figure 12:
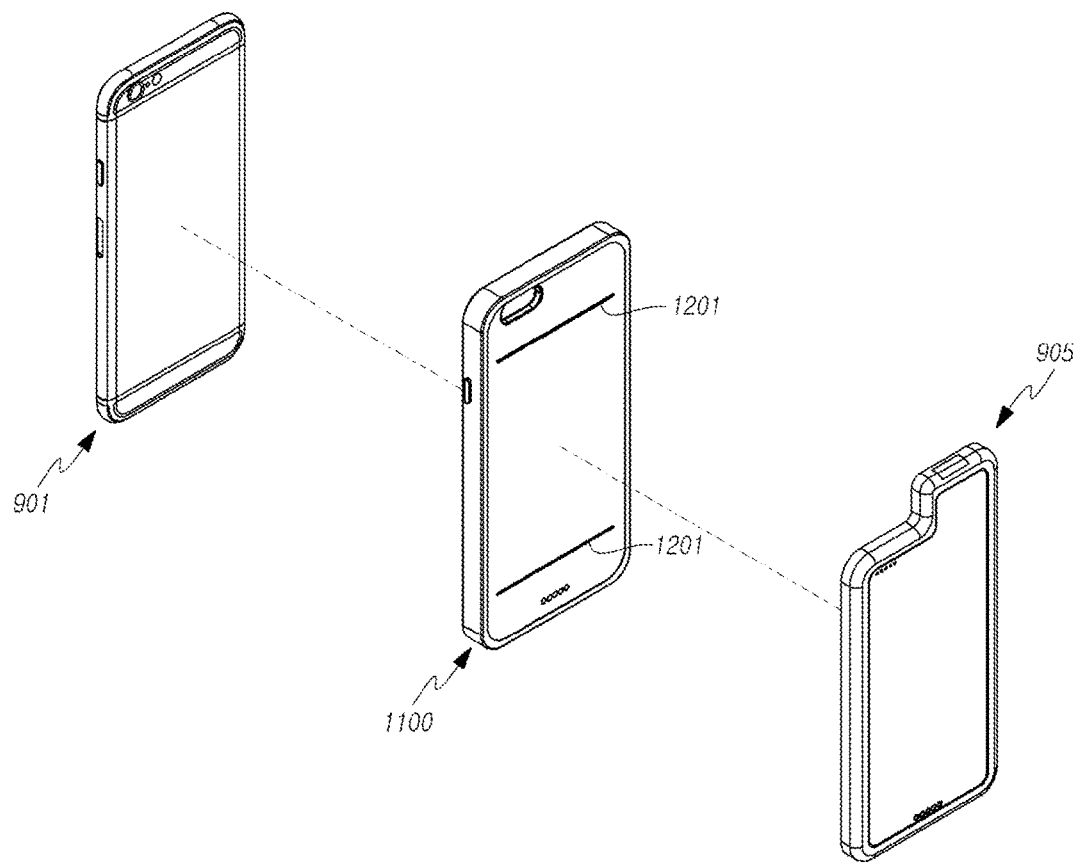
Figure 13:
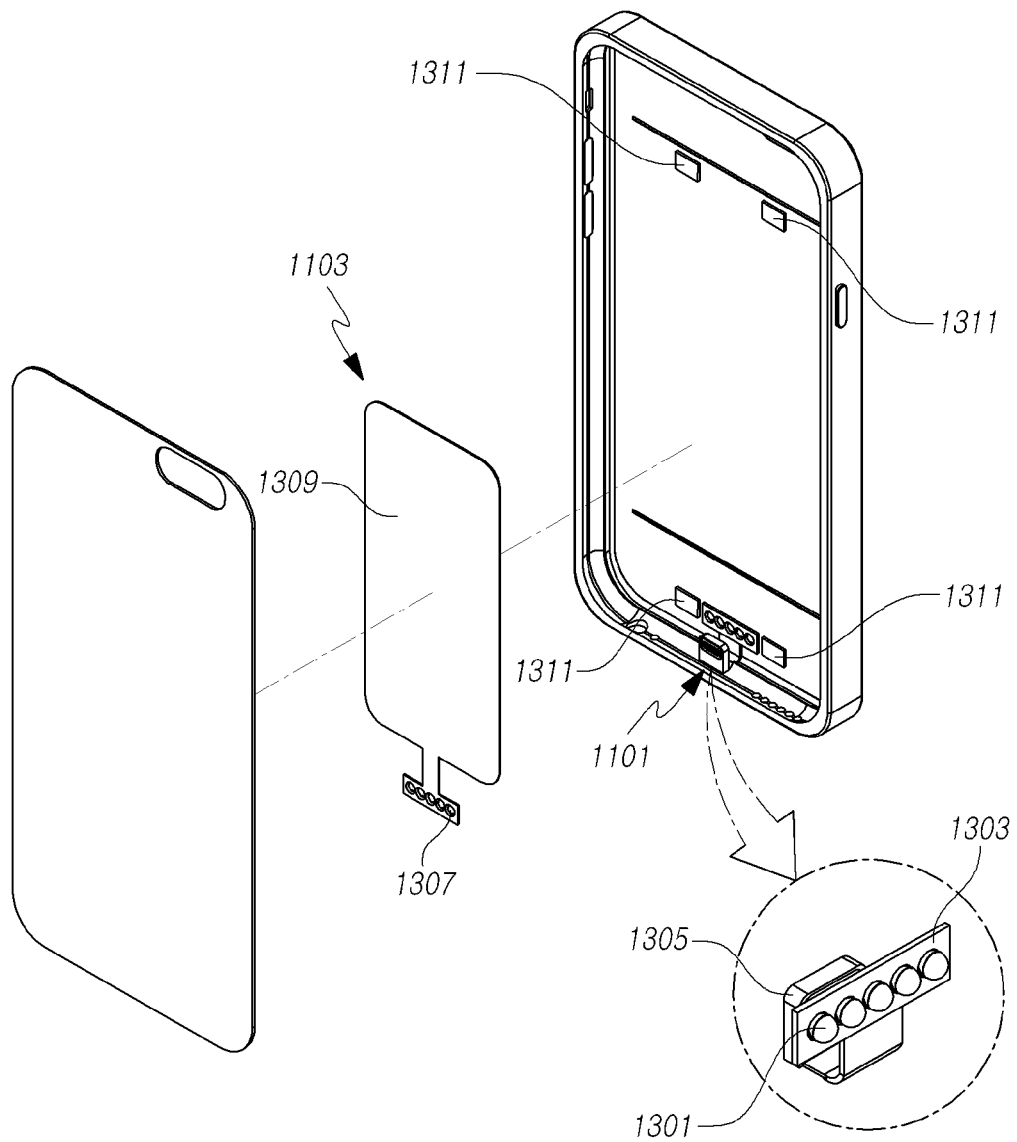
FIG. 13 is an exploded perspective view showing the case part of FIG. 11.
Figure 14:
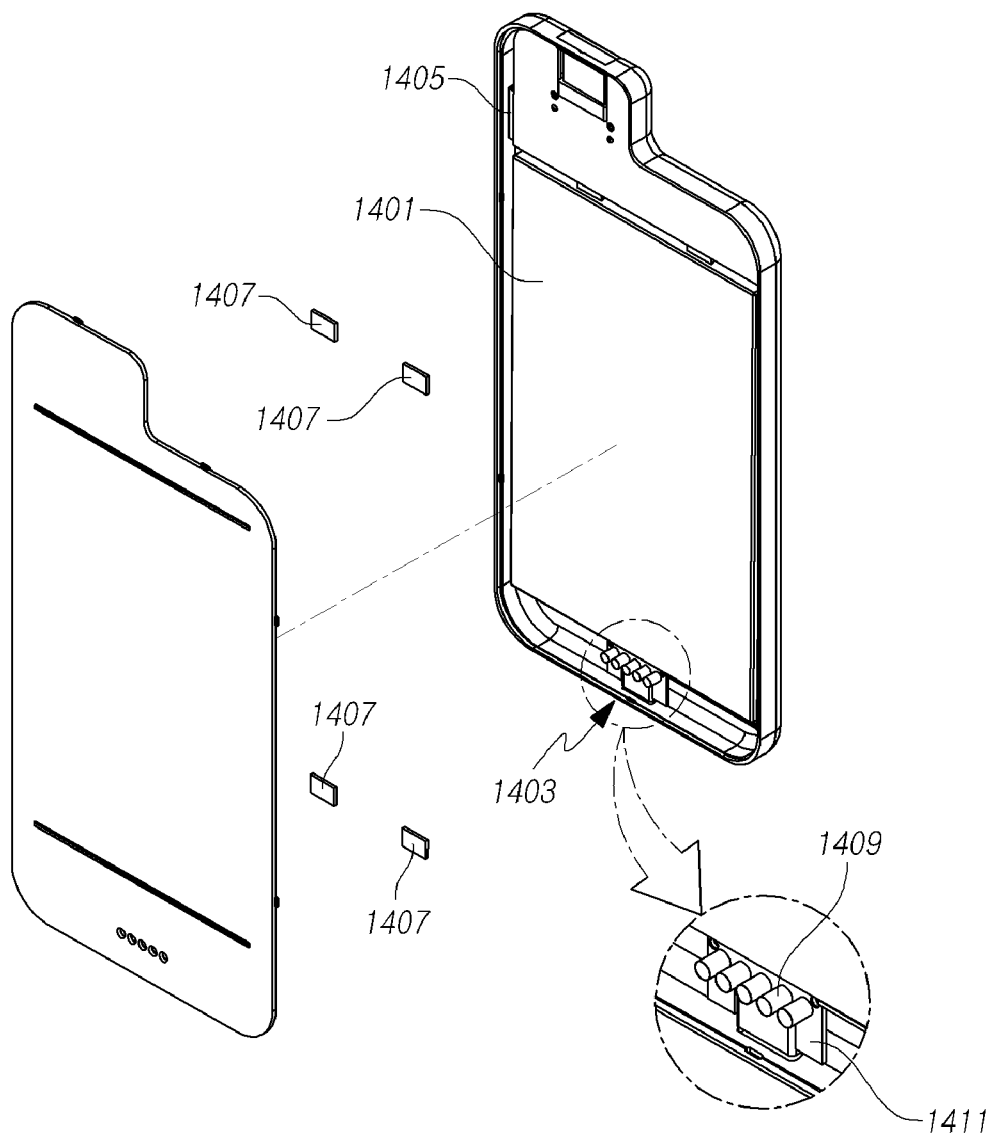
FIG. 14 is an exploded perspective view showing the auxiliary battery part of FIG. 11.
Figure 15:
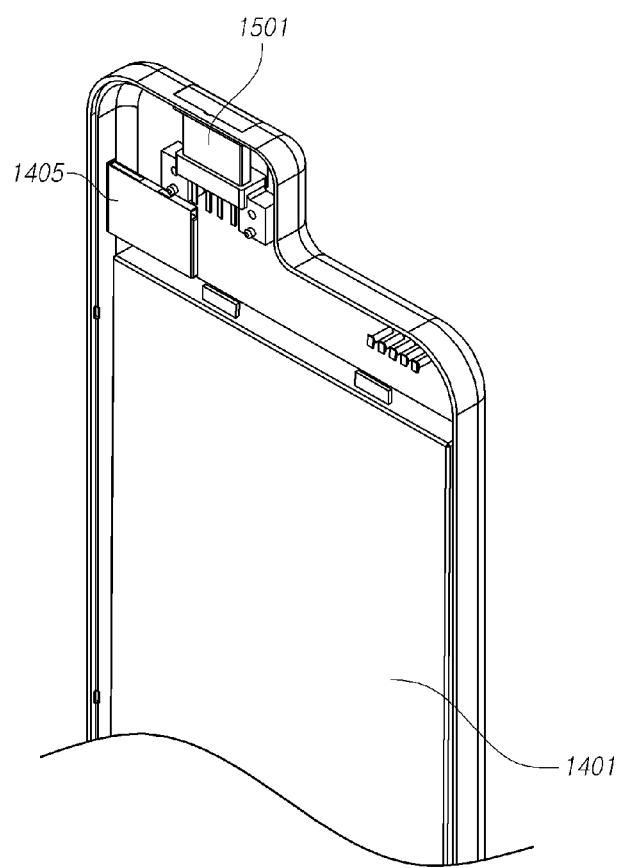
FIG. 15 is a diagram showing part of the internal configuration of the auxiliary battery part of FIG. 14.
Figure 16:
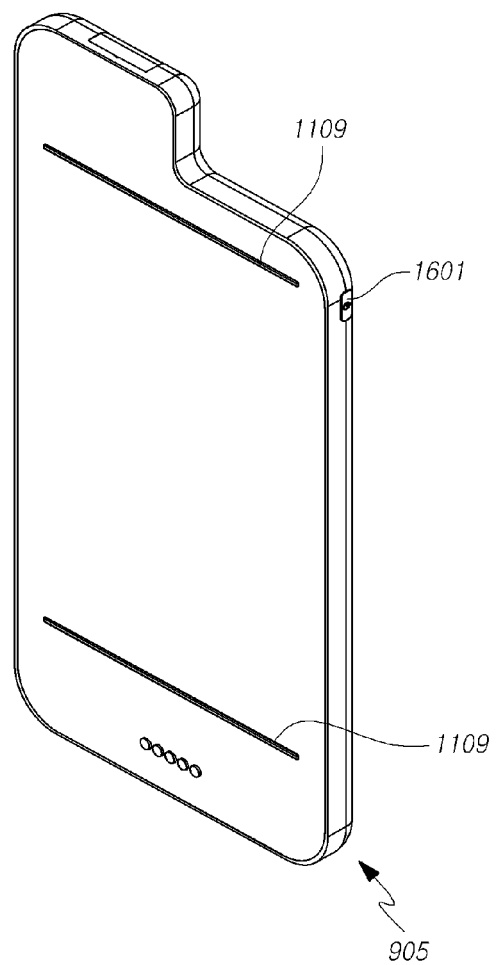
FIG. 16 is a diagram showing an example in which a power switching unit is provided in the auxiliary battery part of FIG. 9.

FIGS. 1 and 2 are perspective views showing a portable charging case module according to an embodiment of the present invention. FIGS. 3 to 5 are diagrams showing the case part of FIG. 1. FIGS. 6 to 8 are diagrams showing the auxiliary battery part of FIG. 1. FIGS. 9 and 10 are perspective views showing a portable terminal and a portable charging case module according to another embodiment of the present invention. FIGS. 11 and 12 are exploded perspective views of FIGS. 9 and 10. FIG. 13 is an exploded perspective view showing the case part of FIG. 11. FIG. 14 is an exploded perspective view showing the auxiliary battery part of FIG. 11. FIG. 15 is a diagram showing part of the internal configuration of the auxiliary battery part of FIG. 14. FIG. 16 is a diagram showing an example in which a power switching unit is provided in the auxiliary battery part of FIG. 9.

As shown in these drawings, a portable charging case module 100 according to an embodiment of the present invention includes: a case part 105 which includes a body 103 configured such that an accommodation recess 101 is formed in the front thereof to be detachably combined with a terminal, a charging coil 501 provided in the body 103 and configured to wirelessly charge the terminal, and a first terminal unit 401 formed in the rear of the body 103 and configured to be electrically or data-wise connected to the terminal; and an auxiliary battery part 109 which is detachably combined with the rear of the case part 10, which includes a second terminal unit 701 configured to be electrically connected to the first terminal unit 401 in the front of the auxiliary battery part 109 facing the rear of the case part 105, and which includes a connection port 107 configured such that a connector connected to an external power source is inserted thereinto.

The case part 105 includes the body 103, the charging coil 501, and the first terminal unit 401.

The body 103 is provided in the form of a three-dimensional structure in the front of which the accommodation recess 101 is formed to be detachably combined with a terminal.

That is, the body 103 is provided in the form of a structure in which the front thereof is open such that a terminal can be fitted into the open front and in which a guide wall configured to support the edge surfaces of the terminal is formed along the edges of the accommodation recess 101.

Meanwhile, the body 103 may include a connection port 111 into which a connector connected to an external power source is inserted.

It will be apparent that the connection port 111 may be formed in the top or bottom of the body 103.

Furthermore, the connection port 111 may be electrically or data-wise connected to the first terminal unit 401 to be described later.

Furthermore, the body 103 may include a fastening portion 403 that is formed in the rear of the body 103.

The fastening portion 403 may engage with a fastening portion 703, formed in the front of the auxiliary battery part 109 to be described later, by being fitted around the auxiliary battery part 109.

In this case, any one of the fastening portions 403 and 703 may be formed in a recess structure, and the other one thereof may be formed in a protrusion structure.

As described above, the fastening portion 403 is formed in the body 103 and the fastening portion 703 is formed in the auxiliary battery part 109, so that the combined body 103 and auxiliary battery part 109 can be firmly fastened to each other and also the first terminal unit 401 of the case part 105 and the second terminal unit 701 of the auxiliary battery part 109 can come into stable contact with each other.

Furthermore, the body 103 may include first magnetic portions 503.

In this case, as an example, the first magnetic portions 503 may be provided on portions above and below or beside the edges of the first terminal unit 401.

These first magnetic portions 503 are provided to have a polarity different from that of second magnetic portions 801 provided on portions above and below or beside the second terminal unit 701 of the auxiliary battery part 109 to be described above, so that the first terminal unit 401 and the second terminal unit 701 can maintain stable contact when the case part 105 and the auxiliary battery part 109 are combined with each other.

Additionally, the body 103 may include a wireless communication module 505. As an example, the wireless communication module 505 may be provided in the form of a near-field communication (NFC) module.

The charging coil 501 is provided in the body 103, and is configured to wirelessly charge a terminal.

In greater detail, a magnetic field is formed in the charging coil 501 by electricity supplied from an external power source or the auxiliary battery part 109 to be described later, and a terminal (a battery inside the terminal) is wirelessly charged with electricity via a magnetic induction method or a magnetic resonance method.

The first terminal unit 401 is formed in the rear of the body 103, and is electrically or data-wise connected to a terminal.

Furthermore, as described above, the first terminal unit 401 may be electrical or data-wise connected to the connection port 111.

Moreover, the auxiliary battery part 109 is detachably combined with the rear of the case part 105.

Meanwhile, the auxiliary battery part 109 may include the fastening portion 703 that is formed in the front of the auxiliary battery part 109. An example of the structure and shape of the fastening portion 703 is the same as described above.

Additionally, the auxiliary battery part 109 includes the second terminal unit 701 that is formed on the front of the auxiliary battery part 109 facing the rear of the case part 105 and that comes into electrical contact with the first terminal unit 401.

Furthermore, the auxiliary battery part 109 includes the connection port 107 that is provided such that a connector connected to an external power source is inserted thereinto.

It will be apparent that the connection port 107 may be electrically connected to the second terminal unit 701 and may be formed in the top or bottom of the auxiliary battery part 109.

Moreover, the auxiliary battery part 109 may includes the fastening portion 703 that is formed on the front of the auxiliary battery part 109. As described above, the fastening portion 703 engages with the fastening portion 403, formed in the rear of the body 103, by being inserted into the fastening portion 403.

Furthermore, the auxiliary battery part 109 may include a display unit 201 configured to display the amount of charging.

Additionally, the auxiliary battery part 109 may include a charging coil 803, and the charging coil 803 functions as a transmission unit in connection with the charging coil 501 provided in the above-described body 103.

It will be apparent that the charging coil 501 provided in the body 103 functions as a reception unit.

Moreover, the auxiliary battery part 109 may include third magnetic portions 805.

Meanwhile, a portable charging case module according to another embodiment of the present invention includes: a case part 1100 which includes a body 903 configured to be detachably combined with a portable terminal 901, a first terminal unit 1101 provided in the body 903 and configured to be electrically or data-wise connected to the portable terminal 901, and a wireless charging patch unit 1103 provided in the body 903 and configured to be electrically connected to the first terminal unit 1101 and to charge the portable terminal 901 connected to the first terminal unit 1101; and a battery part 905 which is detachably combined with the rear of the auxiliary case part 1100, and which includes a battery cell unit 1401, a second terminal unit 1403 configured to be electrically or data-wise connected to the first terminal unit 1101 and to be electrically connected to a connector connected to an external power source, and a memory slot unit 1405 configured such that external memory is accommodated therein or selectively attached thereto and detached therefrom.

The case part 1100 includes the body 903, the first terminal unit 1101, and the wireless charging patch unit 1103.

First, the body 903 provides a frame function of enabling the portable terminal 901 to be detachably combined therewith.

As an example, the body 903 includes: a bumper portion 1105 configured to surround and protect the side surfaces of the portable terminal 901; and a cover portion 1107 configured to close the rear opening of the bumper portion 1105.

In this case, the bumper portion 1105 and the cover portion 1107 may be formed in an integrated form or in a separate form. When the bumper portion 1105 and the cover portion 1107 are formed in a separate form, a user may replace only a damaged portion of the bumper portion 1105 and the cover portion 1107.

The first terminal unit 1101 may be provided in the body 903.

More specifically, the first terminal unit 1101 is provided at the lower end of the cover portion 1107.

The first terminal unit 1101 is electrically or data-wise connected to the portable terminal 901.

An example of the structure of the first terminal unit 1101 is now described in greater detail. The first terminal unit 1101 includes: a frame portion 1303 provided at the lower end of the cover portion 1107 and configured to include one or more connection spheres 1301; and a connection terminal portion 1305 configured to extend from the frame portion 1303 and to be inserted into the connection port of the portable terminal 901.

The frame portion 1303 is provided at the center of the lower end of the cover portion 1107. As an example, the frame portion 1303 may be provided in the form of an oblong plate in which one or more holes are formed to be spaced apart from each other in a widthwise direction.

Furthermore, the frame portion 1303 supports the connection spheres 1301. The connection spheres 1301 are inserted into and supported in the holes formed in the frame portion 1303.

The connection spheres 1301 are electrical or data-wise connected to the connection sphere terminal portions 1307 of the wireless charging patch unit 1103 or the connection bar terminal portions 1409 of the second terminal unit 1403 to be described later.

The connection terminal portion 1305 extends from the frame portion 1303. As an example, the connection terminal portion 1305 extends from the lower end of the frame portion 1303 in a downward direction, is bent and extends forward, and is then bent and extends in an upward direction.

Accordingly, the end portion, i.e., the end portion bent and extending in an upward direction, of the connection terminal portion 1305 can be inserted into the connection port formed in the lower portion of the portable terminal 901.

The wireless charging patch unit 1103 is provided in the body 903.

More specifically, the wireless charging patch unit 1103 is provided in the cover portion 1107.

The wireless charging patch unit 1103 electrically comes into contact with the first terminal unit 1101, and charges the portable terminal 901 connected to the first terminal unit 1101.

An example of the structure of the wireless charging patch unit 1103 is now described in greater detail. The wireless charging patch unit 1103 includes: one or more connection sphere terminal portions 1307 configured to be electrically connected to the connection spheres 1301 of the frame portion 1303; and a patch body portion 1309 configured to extend from the connection sphere terminal portions 1307 and to enable the portable terminal 901 or the battery cell unit 1401 (to be described later) to be wirelessly charged by an external wireless charging device.

The connection sphere terminal portions 1307 are electrical connected to the connection spheres 1301 of the frame portion 1303. A number of connection sphere terminal portions 1307 corresponding to the number of provided connection spheres 1301 are formed.

The patch body portion 1309 extends from the connection sphere terminal portion 1307.

The patch body portion 1309 enables the portable terminal 901 or battery cell unit 1401 to be wirelessly charged by an external wireless charging device.

As an example, the patch body portion 1309 contains an internal coil, and wirelessly charges a battery inside the portable terminal 901 or the battery cell unit 1401 via a magnetic induction method or a magnetic resonance method.

Next, the auxiliary battery part 905 includes the battery cell unit 1401, the second terminal unit 1403, and the memory slot unit 1405.

Furthermore, the auxiliary battery part 905 includes a connection port 1501 to which a cable configured to transmit electricity, charged in the battery cell unit 1401, to an external terminal is detachably connected.

In this case, as an example, the connection port 1501 may be a universal serial bus (USB) port.

The auxiliary battery part 905 is detachably combined with the rear of the case part 1100.

Meanwhile, the case part 1100 includes first magnetic portions 1311 provided in the body 903 so that the auxiliary battery part 905 and the case part 1100 are detachably combined with each other. The auxiliary battery part 905 includes second magnetic portions 1407 having a polarity different from that of the first magnetic portions 1311 so that the auxiliary battery part 905 is combined with the rear of the case part 1100 by magnetic force.

That is, the case part 1100 and the auxiliary battery part 905 are detachably combined with each other by attractive force that acts between the first magnetic portions 1311 and the second magnetic portions 1407.

Furthermore, to more stably combine the case part 1100 and the auxiliary battery part 905 with each other, a first fastening portion 1201 is formed on any one of surfaces facing each other when the case part 1100 and the auxiliary battery part 905 are combined with each other, and a second fastening portion 1109 configured to engage with the first fastening portion 1201 is formed on the other thereof.

Meanwhile, although an example in which the first fastening portion 1201 is formed in the form of a recess and the second fastening portion 1109 is formed in the form of a protrusion has been illustrated in the drawings, the first fastening portion 1201 may be formed in the form of a protrusion and the second fastening portion 1109 may be formed in the form of a recess in a reverse manner.

As an example, the above-described battery cell unit 1401 may be provided in the form of a Li-ion polymer battery.

The second terminal unit 1403 is electrically or data-wise connected to the first terminal unit 1101.

Furthermore, the second terminal unit 1403 is electrically connected to a connector connected to an external power source.

In this case, an example of the connector connected to an external power source may be a MaGnetic Port (MGP) USB cable connector or a micro 5-pin USB cable connector.

Meanwhile, an example of the structure of the second terminal unit 1403 is now described in greater detail. The second terminal unit 1403 includes: the connection bar terminal portions 1409 configured to come into contact with the connection spheres 1301 of the frame portion 1303 of the first terminal unit 1101 and to be electrically connected to a connector connected to an external power source; and a frame portion 1411 configured such that the connection bar terminal portions 1409 are inserted thereinto and supported therein.

As an example, the connection bar terminal portions 1409 are provided in a column shape. One end of each of the connection bar terminal portions 1409 comes into contact with a corresponding one of the connection spheres 1301, and the other end thereof comes into contact with a connector connected to an external power source.

The frame portion 1411 supports the connection bar terminal portions 1409. The frame portion 1411 is provided in the form of a printed circuit board (PCB). As an example, when a connector connected to an external power source comes into contact with the connection bar terminal portions 1409, the battery of the portable terminal 901 may be charged first via a program.

The memory slot unit 1405 functions as a connector in which external memory is accommodated or to and from which external memory is selectively attached and detached. As an example, the memory slot unit 1405 may be formed in the form of a slot in which a micro SD card is accommodated.

Meanwhile, the memory slot unit 1405 enables external memory to be data-wise connected to the portable terminal 901 via the first terminal unit 1101 and the second terminal unit 1403. This process is performed via an application running on the portable terminal 901.

As an example, via an application running on the portable terminal 901, data stored in the portable terminal 901 may be backed up in external memory or data stored in external memory may be restored in the portable terminal 901.

Furthermore, via the application running on the portable terminal 901, data stored in the portable terminal 901 or in external memory may be shared with an external terminal or an external server.

Moreover, the memory slot unit 1405 is formed in the auxiliary battery part 905, and thus a user may increase the capacity of memory of the portable terminal 901 by inserting external memory into the memory slot unit 1405.

Meanwhile, as shown in FIG. 16, the auxiliary battery part 905 may include a power switching unit 1601.

The power switching unit 1601 may be used to selectively turn on and off the operation of the auxiliary battery part 905, to overcome the recognition error of the memory slot unit 1405, and to overcome the cable recognition error of the second terminal unit 1403 and the connection port 1501.

In this case, as an example, the operation of the auxiliary battery part 905 may be repeatedly and sequentially turned on and off when a user presses the power switching unit 1601 for three seconds, and a reset function adapted to overcome the above-described recognition error may be activated when a user presses the power switching unit 1601 for one second.

As described above, at least one embodiment of the present invention provides an advantage of supplying power to the battery of a terminal and charging the battery with the power by using the auxiliary battery part that can be selectively attached to and detached from the case part adapted to protect the terminal, rather than charging the terminal with separate external power via the case part.

Furthermore, at least one embodiment of the present invention provides an advantage of providing the case part and the auxiliary battery part so that they can be attached to and detached from each other, and thus the auxiliary battery part can be combined with and used along with the case part when the battery of a portable terminal needs to be charged with power, thereby improving the convenience of use of the portable terminal.

Furthermore, at least one embodiment of the present invention provides an advantage in which the case part and the auxiliary battery part can be combined with and separated from each other by magnetic force and the case part and the auxiliary battery part are firmly and stably combined with each other by means of the fastening portions that have recess and protrusion structures, respectively, and that are formed in the facing and contact surfaces of the case part and the auxiliary battery part, respectively.

Furthermore, at least one embodiment of the present invention provides an advantage of providing the portable charging case module in the form of modules, such as the case part and the auxiliary battery part, and thus only part of the modules can be replaced when the corresponding module fails or is damaged.

Furthermore, at least one embodiment of the present invention provides an advantage of providing the auxiliary battery part with the memory slot unit configured to accommodate external memory, and thus the storage capacity of the external memory can be added to a portable terminal's own storage capacity and then be used.

Even when all the components constituting an embodiment of the present invention are described as being combined into a single body or as operating in a combined form, the present invention is not necessarily limited to the embodiment. That is, within the scope of the purpose of the present invention, all the components may be selectively combined into one or more and then operate.

Furthermore, the terms "include," "comprise," "have," and the like used herein designate the presence of corresponding components. These terms should not be construed as excluding another component, but should be construed as possibly including another component. Unless otherwise defined herein, all the terms, including technical or scientific terms, used herein have the same meanings as commonly understood by those skilled in the art to which the present invention pertains. The terms commonly used, such as those defined in dictionaries, should be interpreted as having meanings that are consistent with their meanings in the context of the specification and relevant art, and should not be interpreted in an idealized or overly formal sense unless expressly so defined herein.

The above description is merely an illustrative description of the technical spirit of the present invention. Accordingly, it will be apparent to those having ordinary knowledge in the art to which the present invention pertains that various modifications and alterations may be made within the range that does not depart from the essential scope of the present invention. Therefore, the embodiments disclosed herein are not intended to limit the technical spirit of the present invention, but are intended to illustrate the present invention. The scope of the technical spirit of the present invention is not limited by these embodiments. The range of protection of the present invention should be defined based on the following claims, and all technical spirits equivalent to the following claims should be construed as falling within the range of protection of the present invention.

What is claimed is:

1. A portable charging case module, comprising:
   a case part which includes a body configured to be detachably combined with a portable terminal, a first terminal unit provided in the body and configured to be electrically or data-wise connected to the portable terminal, and a wireless charging patch unit provided in the body and configured to be electrically connected to the first terminal unit and to charge the portable terminal connected to the first terminal unit; and
   an auxiliary battery part which is detachably combined with a rear of the case part, and which includes a battery cell unit, a second terminal unit configured to be electrically or data-wise connected to the first terminal unit and to be electrically connected to a connector connected to an external power source, and a memory slot unit configured such that external memory is accommodated therein or selectively attached thereto and detached therefrom,
   wherein the body comprises:
   a bumper portion configured to surround and protect side surfaces of the portable terminal; and
   a cover portion configured to close a rear opening of the bumper portion,
   wherein the first terminal unit comprises:
   a frame portion provided at a lower end of the cover portion, and provided with a connection sphere; and
   a connection terminal portion configured to extend from the frame portion and to be inserted into a connection port of the portable terminal, and
   wherein the wireless charging patch unit comprises:
   a connection sphere terminal portion configured to come into electrical contact with the connection sphere of the frame portion; and
   a patch body portion configured to extend from the connection sphere terminal portion and to enable the portable terminal or battery cell unit to be wirelessly charged via an external wireless charging device.

2. The portable charging case module of claim 1, wherein the memory slot unit enables the external memory to be data-wise connected to the portable terminal via the first terminal unit and the second terminal unit.

3. The portable charging case module of claim 1, wherein:
   the case part comprises a first magnetic portion provided in the body; and
   the auxiliary battery part comprises a second magnetic portion configured to have a polarity different from that of the first magnetic portion so that the auxiliary battery part can be combined with a rear of the case part by magnetic force.

4. The portable charging case module of claim 1, wherein the second terminal unit comprises:
   a connection bar terminal portion configured to come into contact with the connection sphere of the frame portion of the first terminal unit and to come into electrical contact with the connector; and
   a frame portion configured such that the connection bar terminal portion is inserted thereinto and supported therein.

* * * * *